US012572701B2

(12) United States Patent
Srinivasan et al.

(10) Patent No.: US 12,572,701 B2
(45) Date of Patent: Mar. 10, 2026

(54) PATH-BASED LAYER STACK CONNECTIVITY CHECK FOR PLASMA INDUCED DAMAGE AVOIDANCE

(71) Applicant: Siemens Industry Software Inc., Plano, TX (US)

(72) Inventors: Sridhar Srinivasan, Tualatin, OR (US); Yi-Ting Lee, Zhubei City (TW); Lei Ling, Fremont, CA (US); Chung Lee, Tigard, OR (US)

(73) Assignee: Siemens Industry Software Inc., Plano, TX (US)

( * ) Notice: Subject to any disclaimer, the term of this patent is extended or adjusted under 35 U.S.C. 154(b) by 0 days.

(21) Appl. No.: 18/856,912

(22) PCT Filed: Jun. 16, 2022

(86) PCT No.: PCT/US2022/072976
§ 371 (c)(1),
(2) Date: Oct. 15, 2024

(87) PCT Pub. No.: WO2023/224670
PCT Pub. Date: Nov. 23, 2023

(65) Prior Publication Data
US 2025/0117524 A1      Apr. 10, 2025

Related U.S. Application Data

(60) Provisional application No. 63/364,884, filed on May 18, 2022.

(51) Int. Cl.
*G06F 30/367* (2020.01)
*G06F 21/71* (2013.01)
(Continued)

(52) U.S. Cl.
CPC ............ *G06F 21/71* (2013.01); *G06F 30/367* (2020.01); *G06F 30/398* (2020.01); *G06F 2119/10* (2020.01)

(58) Field of Classification Search
CPC ............ G06F 11/3006; G06F 11/3027; G06F 3/1423; G06F 21/35; G06F 3/04883;
(Continued)

(56) References Cited

U.S. PATENT DOCUMENTS 8,595,669 B1 * 11/2013 Keller .................... G06F 30/39
716/108
10,771,108 B1 * 9/2020 Fazeel ................. H10D 84/811
(Continued)

FOREIGN PATENT DOCUMENTS

CN        205069628 U      3/2016
CN        107331662 A     11/2017
(Continued)

OTHER PUBLICATIONS

Vittal Ashok et al: "Modeling crosstalk in resistive VLSI interconnections", VLSI Design, 1999. Proceedings. Twelfth International Conference on GOA, India Jan. 7-10, 1999, Los Alamitos, CA, USA,IEEE Comput. Soc, US, Jan. 7, 1999 (Jan. 7, 1999), pp. 470-475, XP032393533, DOI: 10.1109/ICVD.1999.745200, ISBN: 978-0-7695-0013-3.
(Continued)

*Primary Examiner* — Binh C Tat

(57) ABSTRACT

This application discloses a computing system implementing a reliability verification tool to identify a portion of a layout design describing an integrated circuit includes a victim transistor having a gate connected to an aggressor transistor. The reliability verification tool can extract a resistance network for connections between the victim transistor and the aggressor transistor, and simulate the resistive
(Continued)

network to determine connectivity between the wells of the victim transistor and the aggressor transistor occurs prior to the victim transistor having a gate connected to an aggressor transistor.

18 Claims, 6 Drawing Sheets

(51) Int. Cl.
_G06F 30/398_ (2020.01)
_G06F 119/10_ (2020.01)

(58) Field of Classification Search
CPC .... G06F 21/6218; G06F 40/216; G06F 21/56; G06F 21/82; G06F 21/32; G06F 21/71; G06F 30/367; G06F 30/398; G06F 2119/10; G06F 3/012; H01L 23/528; H01L 21/76886; H01L 2924/00
USPC .................................................. 716/100–106
See application file for complete search history.

(56) References Cited

U.S. PATENT DOCUMENTS

2012/0210283 A1\* 8/2012 Li ......................... G06F 30/398
716/112
2020/0279817 A1 9/2020 Missoni et al.

2021/0242194 A1\* 8/2021 Ma ......................... H10D 84/40
2022/0163580 A1\* 5/2022 Byrd ...................... G01R 31/14

FOREIGN PATENT DOCUMENTS

JP 2011009579 A 1/2011
WO 2004042809 A1 5/2004

OTHER PUBLICATIONS

Etherton M et al: "Verification of CDM circuit simulation using an ESD evaluation circuit", Electrical Overstress/Electrostatic Discharge Symposium, 2005. EOS/ESD '05, IEEE, Piscataway, NJ, USA, Sep. 8, 2005 (Sep. 8, 2005), pp. 1-10, XP031533812,ISBN: 978-1-58537-069-6.

Isogai T et al: "Advanced Method for Measuring Ultra-Low Contact Resistivity Between Silicide and Silicon Based on Cross Bridge Kelvin Resistor", Microelectronic Test Structures, 2009. ICMTS 2009. IEEE International Conference on, IEEE, Piscataway, NJ, USA, Mar. 30, 2009 (Mar. 30, 2009), pp. 109-113, XP031449269, ISBN: 978-1-4244-4259-1.

Li Junkang:; "High-performance low-power germanium Channel field effect transistor technology The research"; Ph. D. Electronic Journal; No. 202201 period; Jan. 15, 2022.

Landolt Olivier et al:; "Analog Nonlinear Function Synthesis"; IEEE Micro, pp. 50-52.

\* cited by examiner

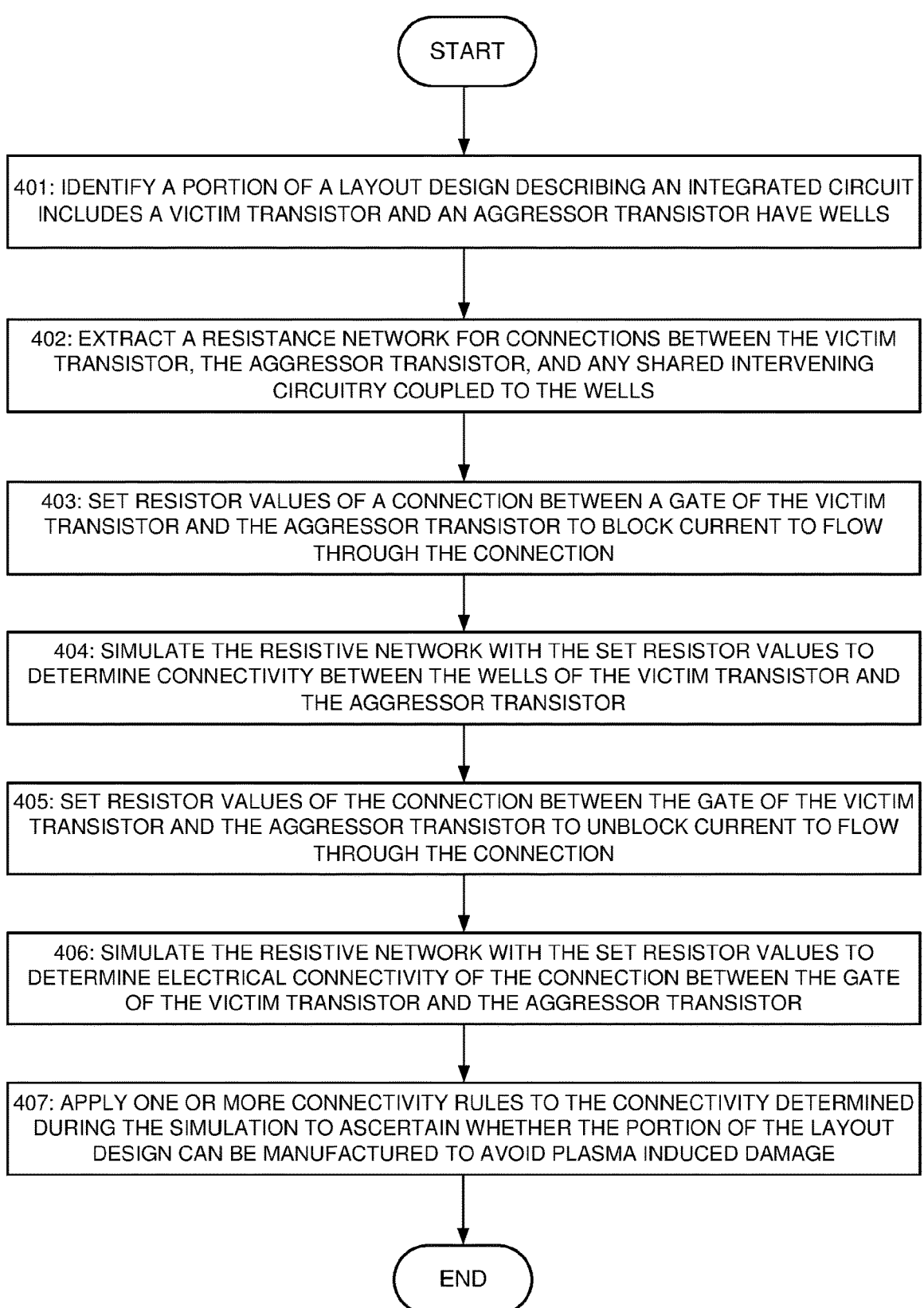

START

401: IDENTIFY A PORTION OF A LAYOUT DESIGN DESCRIBING AN INTEGRATED CIRCUIT INCLUDES A VICTIM TRANSISTOR AND AN AGGRESSOR TRANSISTOR HAVE WELLS

402: EXTRACT A RESISTANCE NETWORK FOR CONNECTIONS BETWEEN THE VICTIM TRANSISTOR, THE AGGRESSOR TRANSISTOR, AND ANY SHARED INTERVENING CIRCUITRY COUPLED TO THE WELLS

403: SET RESISTOR VALUES OF A CONNECTION BETWEEN A GATE OF THE VICTIM TRANSISTOR AND THE AGGRESSOR TRANSISTOR TO BLOCK CURRENT TO FLOW THROUGH THE CONNECTION

404: SIMULATE THE RESISTIVE NETWORK WITH THE SET RESISTOR VALUES TO DETERMINE CONNECTIVITY BETWEEN THE WELLS OF THE VICTIM TRANSISTOR AND THE AGGRESSOR TRANSISTOR

405: SET RESISTOR VALUES OF THE CONNECTION BETWEEN THE GATE OF THE VICTIM TRANSISTOR AND THE AGGRESSOR TRANSISTOR TO UNBLOCK CURRENT TO FLOW THROUGH THE CONNECTION

406: SIMULATE THE RESISTIVE NETWORK WITH THE SET RESISTOR VALUES TO DETERMINE ELECTRICAL CONNECTIVITY OF THE CONNECTION BETWEEN THE GATE OF THE VICTIM TRANSISTOR AND THE AGGRESSOR TRANSISTOR

407: APPLY ONE OR MORE CONNECTIVITY RULES TO THE CONNECTIVITY DETERMINED DURING THE SIMULATION TO ASCERTAIN WHETHER THE PORTION OF THE LAYOUT DESIGN CAN BE MANUFACTURED TO AVOID PLASMA INDUCED DAMAGE

END

FIG. 4

PATH-BASED LAYER STACK CONNECTIVITY CHECK FOR PLASMA INDUCED DAMAGE AVOIDANCE

RELATED APPLICATION

This patent application claims priority to U.S. Provisional Patent Application No. 63/364,884, filed May 18, 2022, which is incorporated by reference herein.

TECHNICAL FIELD

This application is generally related to electronic design automation and, more specifically, to path-based layer stack connectivity check for plasma induced damage avoidance.

BACKGROUND

In a design flow for fabricating integrated circuits, a physical design of an integrated circuit can describe specific geometric elements, often referred to as a layout design. The geometric elements, which typically are polygons, define the shapes that will be created in various materials to manufacture the integrated circuit. Typically, a designer will select groups of geometric elements representing circuit device components, e.g., contacts, gates, etc., and place them in a design area. These groups of geometric elements may be custom designed, selected from a library of previously-created designs, or some combination of both. Once the groups of geometric elements representing circuit device components have been placed, geometric elements representing connection lines then are then placed between these geometric elements according to the predetermined route. These lines will form the wiring used to interconnect the electronic devices.

Descriptions for physical designs of integrated circuits can be provided in many different formats. The Graphic Data System II (GDSII) format is a popular format for transferring and archiving two-dimensional (2D) graphical circuit layout data. Among other features, it contains a hierarchy of structures, each structure including layout elements (e.g., polygons, paths or poly-lines, circles and text-boxes). Other formats include an open source format named Open Access, Milkyway, EDDM, and Open Artwork System Interchange Standard (OASIS). These various industry formats are used to define the geometrical information in layout designs that are employed to manufacture integrated circuits. Once the design is finalized, the layout portion of the design can be used by fabrication tools to manufacture the circuit using a photolithographic process.

There are many different fabrication processes for manufacturing a circuit, but most processes include a series of steps that deposit layers of different materials on a substrate, expose specific portions of each layer to radiation, and then etch the exposed (or non-exposed) portions of the layer away. For example, a simple semiconductor device component could be manufactured by the following steps. First, a positive type epitaxial layer is grown on a silicon substrate through chemical vapor deposition. Next, a nitride layer is deposited over the epitaxial layer. Then specific areas of the nitride layer are exposed to radiation, and the exposed areas are etched away, leaving behind exposed areas on the epitaxial layer, (i.e., areas no longer covered by the nitride layer). The exposed areas then are subjected to a diffusion or ion implantation process, causing dopants, for example phosphorus, to enter the exposed epitaxial layer and form charged wells. This process of depositing layers of material on the substrate or subsequent material layers, and then exposing specific patterns to radiation, etching, and dopants or other diffusion materials, is repeated a number of times, allowing the different physical layers of the circuit to be manufactured.

During manufacture of the integrated circuits, transistors can have gate dielectrics thin enough, for example, only a few molecules thick, to become damaged when a transistor gate receives a higher than expected voltage. For example, an aggressor transistor can be designed to provide a voltage to a gate of a victim transistor. To avoid having the gate dielectric of the victim transistor damaged during manufacturing, the foundry will typically manufacture the transistors by manufacturing a connection between the wells of the aggressor transistor and the victim transistor and then manufacturing the connection from the aggressor transistor to the gate of the victim transistor.

Many foundries generate connectivity rules, which can be used to ensure layout designs having pairs of aggressor and victim transistors will manufacture the connection between the wells of the aggressor transistor and the victim transistor before manufacturing the connection from the aggressor transistor to the gate of the victim transistor. Traditional verification tools apply these connectivity rules in a step-by-step fashion, by analyzing the layers of the layout design from the substrate up to the metal layers. Oftentimes, however, victim and aggressor transistor wells are not directly connected in the layout designs, but instead include intervening circuitry, such as a current pump, an intermediate well, or the like. This lack of direct connectivity between the victim and aggressor transistor wells can stifle traditional verification tools and render that portion of the layout design unchecked against the connectivity rules.

SUMMARY

This application discloses a computing system implementing a reliability verification tool to identify a portion of a layout design describing an integrated circuit includes a victim transistor having a gate connected to an aggressor transistor. The reliability verification tool can extract a resistance network for connections between the victim transistor and the aggressor transistor, and simulate the resistive network to determine connectivity between the wells of the victim transistor and the aggressor transistor occurs prior to the victim transistor having a gate connected to an aggressor transistor. Embodiments of will be described below in greater detail.

DESCRIPTION OF THE DRAWINGS

FIG. 4 illustrates a flowchart showing example path-based layer stack connectivity check for plasma induced damage avoidance according to various examples.

DETAILED DESCRIPTION

Illustrative Operating Environment

Figure 1:
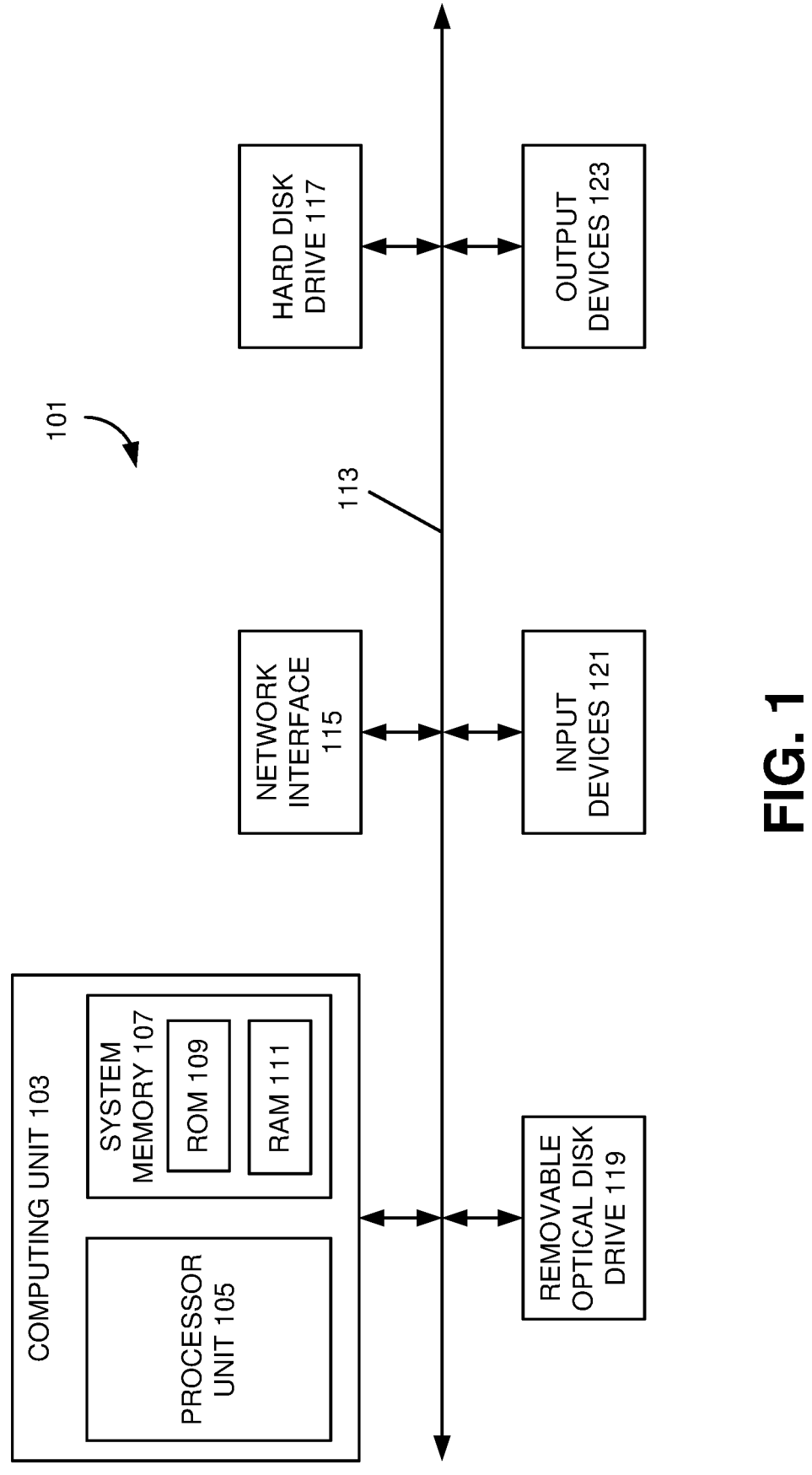
FIGS. 1 and 2 illustrate an example of a computer system of the type that may be used to implement various embodiments.

Various examples may be implemented through the execution of software instructions by a computing device 101, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices 115-123. For example, the processing unit 105 or the system memory 107 may be directly or indirectly connected to one or more additional memory storage devices, such as a hard disk drive 117, which can be magnetic and/or removable, a removable optical disk drive 119, and/or a flash memory card. The processing unit 105 and the system memory 107 also may be directly or indirectly connected to one or more input devices 121 and one or more output devices 123. The input devices 121 may include, for example, a keyboard, a pointing device (such as a mouse, touchpad, stylus, trackball, or joystick), a scanner, a camera, and a microphone. The output devices 123 may include, for example, a monitor display, a printer and speakers. With various examples of the computing device 101, one or more of the peripheral devices 115-123 may be internally housed with the computing unit 103. Alternately, one or more of the peripheral devices 115-123 may be external to the housing for the computing unit 103 and connected to the bus 113 through, for example, a Universal Serial Bus (USB) connection.

With some implementations, the computing unit 103 may be directly or indirectly connected to a network interface 115 for communicating with other devices making up a network. The network interface 115 can translate data and control signals from the computing unit 103 into network messages according to one or more communication protocols, such as the transmission control protocol (TCP) and the Internet protocol (IP). Also, the network interface 115 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 101 is illustrated as an example only, and it not intended to be limiting. Various embodiments may be implemented using one or more computing devices that include the components of the computing device 101 illustrated in FIG. 1, which include only a subset of the components illustrated in FIG. 1, or which include an alternate combination of components, including components that are not shown in FIG. 1. For example, various embodiments may be implemented using a multi-processor computer, a plurality of single and/or multiprocessor computers arranged into a network, or some combination of both.

Figure 2:
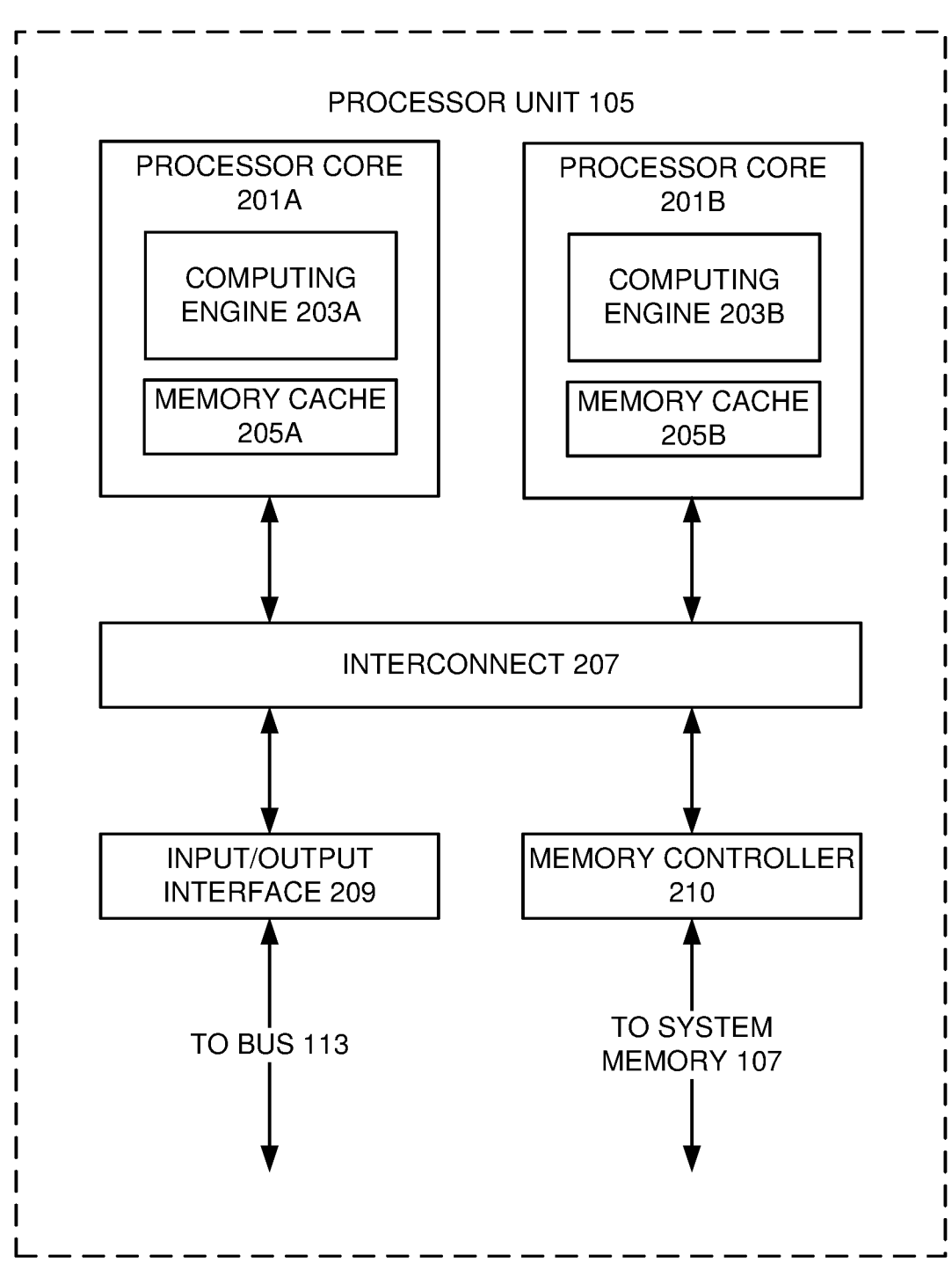

With some implementations, the processor unit 105 can have more than one processor core. Accordingly, FIG. 2 illustrates an example of a multi-core processor unit 105 that may be employed with various embodiments. As seen in this figure, the processor unit 105 includes a plurality of processor cores 201A and 201B. Each processor core 201A and 201B includes a computing engine 203A and 203B, respectively, and a memory cache 205A and 205B, respectively. As known to those of ordinary skill in the art, a computing engine 203A and 203B can include logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203A and 203B may then use its corresponding memory cache 205A and 205B, respectively, to quickly store and retrieve data and/or instructions for execution.

Each processor core 201A and 201B is connected to an interconnect 207. The particular construction of the interconnect 207 may vary depending upon the architecture of the processor unit 105. With some processor cores 201A and 201B, such as the Cell microprocessor created by Sony Corporation, Toshiba Corporation and IBM Corporation, the interconnect 207 may be implemented as an interconnect bus. With other processor units 201A and 201B, however, such as the Opteron™ and Athlon™ dual-core processors available from Advanced Micro Devices of Sunnyvale, California, the interconnect 207 may be implemented as a system request interface device. In any case, the processor cores 201A and 201B communicate through the interconnect 207 with an input/output interface 209 and a memory controller 210. The input/output interface 209 provides a communication interface to the bus 113. Similarly, the memory controller 210 controls the exchange of information to the system memory 107. With some implementations, the processor unit 105 may include additional components, such as a high-level cache memory accessible shared by the processor cores 201A and 201B. It also should be appreciated that the description of the computer network illustrated in FIG. 1 and FIG. 2 is provided as an example only, and it not intended to suggest any limitation as to the scope of use or functionality of alternate embodiments.

Path-Based Layer Stack Connectivity Check for Plasma Induced Damage Avoidance

Figure 3:
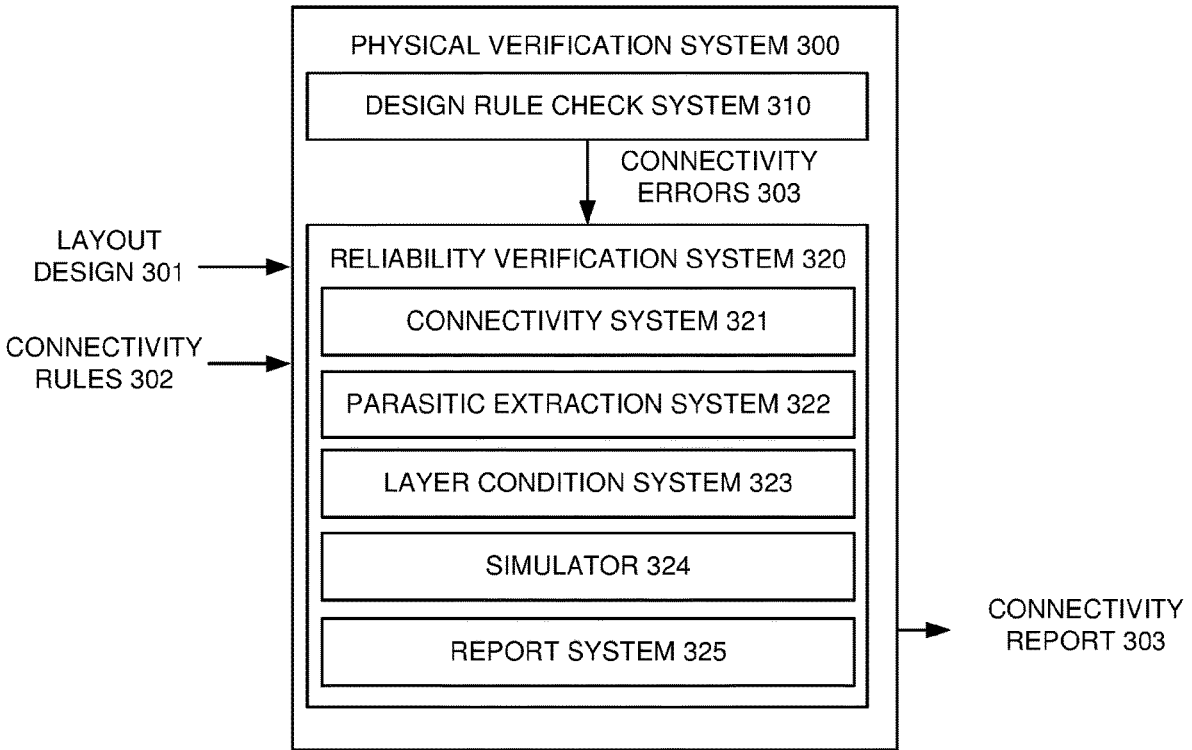
FIG. 3 illustrates an example of a physical verification system including a reliability verification system to perform a path-based layer stack connectivity check for plasma induced damage avoidance according to various embodiments.

FIG. 3 illustrates an example of a physical verification system 300 including a reliability verification system 320 to perform a path-based layer stack connectivity check for plasma induced damage avoidance according to various embodiments. FIG. 4 illustrates a flowchart showing example path-based layer stack connectivity check for plasma induced damage avoidance according to various examples. Referring to FIGS. 3 and 4, the physical verification system 300 can receive a layout design 301 of an electronic system. The layout design 301 can define geometrical information capable of being utilized to manufacture an integrated circuit, such as the electronic system, which can be specified in a Graphic Data System II (GDSII) format, an Open Access format, a Milkyway format, an EDDM format, an Open Artwork System Interchange Standard (OASIS) format, or the like. The physical verification system 300 also can receive connectivity rules 302, for example, from a foundry or integrated circuit manufacturer, to identify valid types of connectivity in the layout design 301 and a manufacturing order for circuit device connectivity.

The physical verification system 300, in some embodiments, can include a design rule check system 310 to analyze the layout design 301 to determine whether the circuitry within the layout design 301 conforms to design rules from a foundry capable of manufacturing an integrated circuit described by the layout design 301. The design rule check system 310, when determining whether the layout design 301 conforms to the connectivity rules 302, can perform a sequential, layer-by-layer check for electrical connectivity of the integrated circuit. The design rule check system 310 can identify connectivity on different layers of the integrated circuit in the order that they are to be manufactured, e.g., starting at the substrate layer before moving to the diffusion layer, and then to each of the stacked metal layers.

The design rule check system 310 can utilize the identified connectivity on the different layers to perform the connectivity checks based on the connectivity rules 302. In some embodiments, when the design rule check system 310 identifies a pair of transistors do not conform to the connectivity rules 302, for example, due to no connectivity between the wells of the transistors prior to connecting a gate region of at least one of the transistors, the design rule check system 310 can generate one or more connectivity errors 303. In some instances, the connectivity errors 303 generated by the design rule check system 310 can be false, for example, as the pair of transistors can connect their wells to a common voltage potential through shared intervening circuitry, such as a current pump circuit or an intermediate well.

The physical verification system 300 can include a reliability verification system 320 to determine whether the layout design 301 conforms to the connectivity rules 302. In some embodiments, the reliability verification system 320 can receive the connectivity errors 303 from the design rule check system 310. The reliability verification system 320 can analyze the portions of the layout design 301, which may be associated with the connectivity errors 303, to ascertain whether the pair of transistors can connect their wells to a common voltage potential, either directly or through shared intervening circuitry, such as a current pump circuit or an intermediate well, and also whether the connection allows the pair of transistors to conform to the connectivity rules 302. In some embodiments, the reliability verification system 320 can determine whether the layout design 301 conforms to the connectivity rules 302 independently of any connectivity errors 303 generated by the design rule check system 310 and/or without the design rule check system 310 performing a check of the layout design 301 against the connectivity rules 302.

The reliability verification system 320 can include a connectivity system 321 to identify the circuit devices and their connectivity described in the layout design 301. For example, the connectivity system 321 can analyze the geometric information in the layout design 301 to identify circuit device and their connectivity. In some embodiments, the connectivity system 321, in a block 401, can identify a portion of a layout design describing an integrated circuit includes a victim transistor and an aggressor transistor have wells. In some embodiments, the wells of the victim transistor and the aggressor transistor can be coupled to shared intervening circuitry. Embodiments of an aggressor transistor, victim transistor, and intervening circuitry in a layout design will be described below in greater detail with reference to FIG. 5.

Figures 5, 6A:
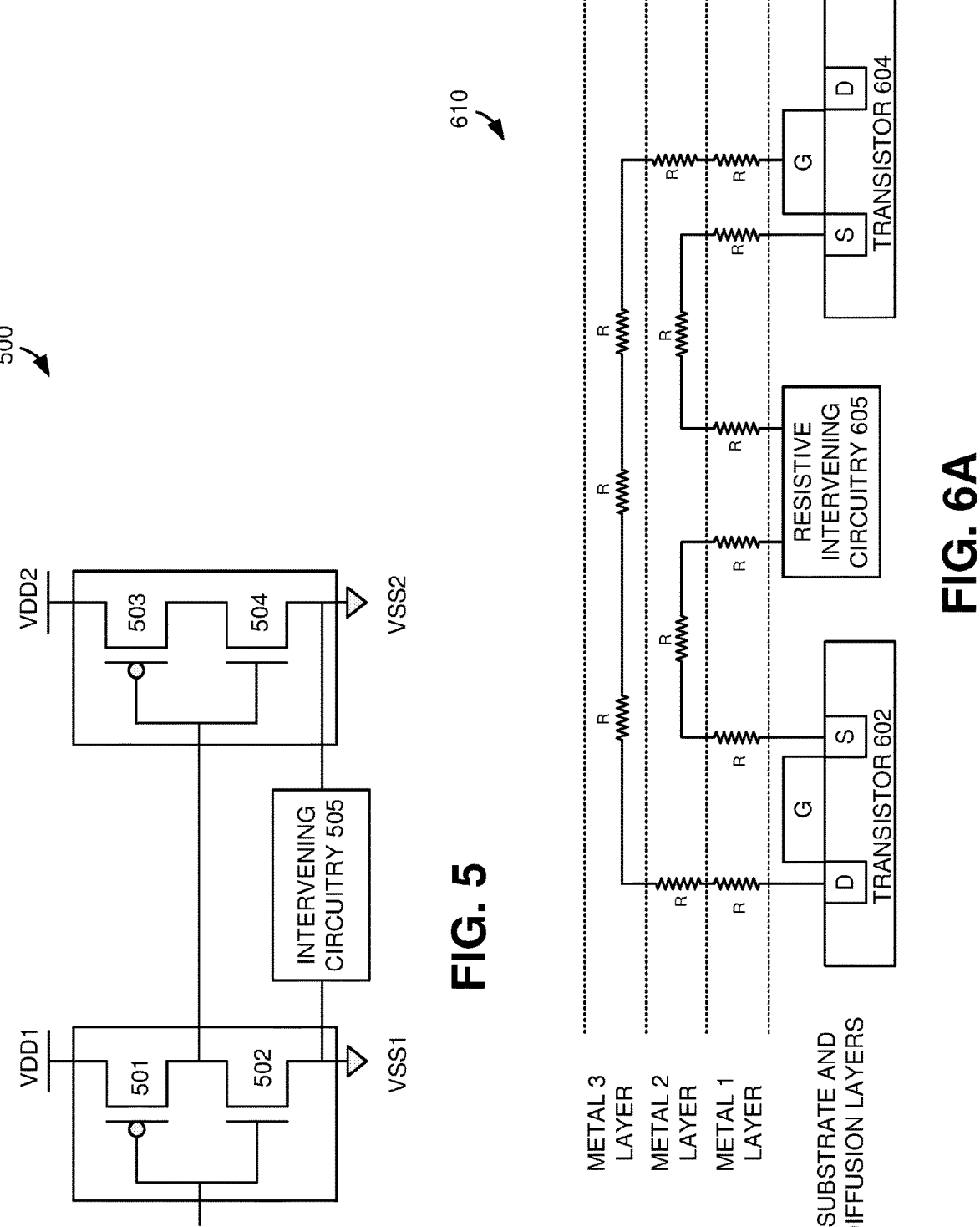
FIG. 5 illustrates an example layout design having an aggressor transistor, victim transistor, and intervening circuitry according to various embodiments.
FIGS. 6A-6C illustrates an example path-based layer stack connectivity check for plasma induced damage avoidance for the layout design described in FIG. 5.

FIG. 5 illustrates an example layout design having an aggressor transistor, victim transistor, and intervening circuitry according to various embodiments. Referring to FIG. 5, a portion of an integrated circuit 500 can include transistors 501-504. The transistors 501 and 503 can be P-Channel Metal-Oxide-Semiconductor (PMOS) transistors, while the transistors 502 and 504 can be N-Channel Metal-Oxide-Semiconductor (NMOS) transistors. The transistors 501 and 502 can form to a switch having their drain regions coupled to the gate regions of the transistors 503 and 504. The source regions of transistors 502 and 504 can be connected via intervening circuitry 505, which can include at least one current pump, intermediate well, other circuitry coupled between the wells of the transistors 502 and 504, or a combination thereof. During manufacture, the connection of the source regions of transistors 502 and 504 via the intervening circuitry 505 should be manufactured prior to the manufacturing of the connection between the drain regions of the transistors 501 and 502 and the gate regions of the transistors 503 and 504 in order to avoid any plasma induced damage to a dielectric for the gate regions of the transistors 503 and 504.

Referring back to FIGS. 3 and 4, the reliability verification system 320 can include a parasitic extraction system 322 to determine resistive electrical characteristics for circuitry identified by the connectivity system 321 in the layout design 301, for example, by converting polygons on layers of the layout design 301 into an equivalent resistive representation. The parasitic extraction system 322 can aggregate the resistive electrical characteristics into a resistive network, which can be the equivalent resistive representation of the circuitry identified by the connectivity system 321. In some embodiments, the parasitic extraction system 322, in a block 402, can extract a resistance network for connections between the victim transistor, the aggressor transistor, and any shared intervening circuitry coupled between the wells of the victim and aggressor transistors. Embodiments of resistance network for connections between the victim transistor, the aggressor transistor, and the shared intervening circuitry will be described below in greater detail with reference to FIG. 6A.

Figures 6B, 6C:
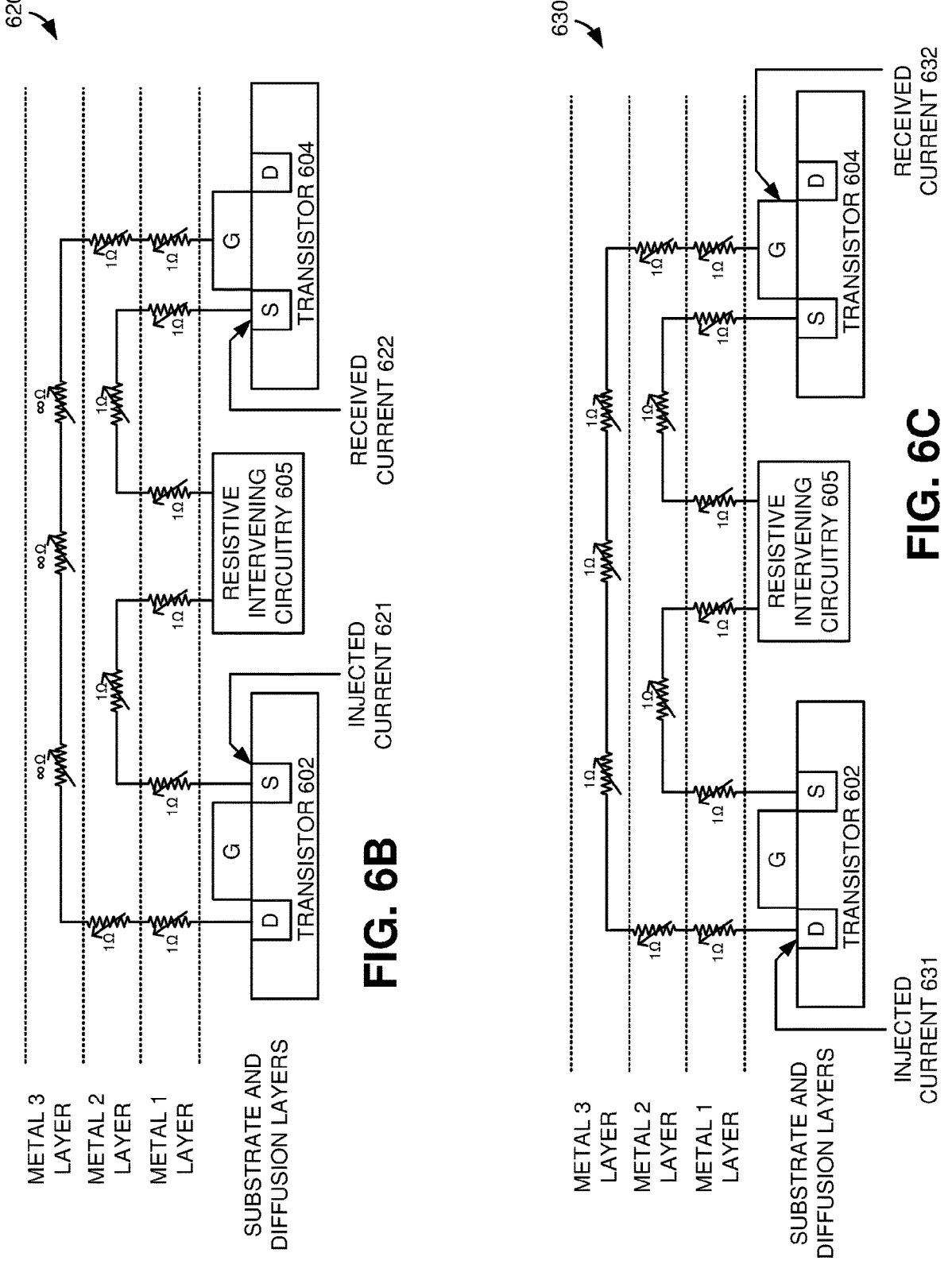

FIGS. 6A-6C illustrates an example path-based layer stack connectivity check for plasma induced damage avoidance for the layout design described in FIG. 5. Referring to FIG. 6A, a resistive network 610 can be a resistive electrical representation of a portion of the integrated circuit 500 in FIG. 5. The resistive network 610 can include a pair of transistors 602 and 604, which can correspond to transistors 502 and 504 in FIG. 5. The transistors 602 and 604 can be connected to a resistive intervening circuit 605, which can correspond to the intervening circuitry 505 in FIG. 5. The resistive representation also can include resistors R representing the various connections between the transistors 602 and 604 and the resistive intervening circuitry 605 along with their locations within the different metal layers of the integrated circuit.

Referring back to FIGS. 3 and 4, the reliability verification system 320 can include a layer condition system 323 to set the various conditions of the integrated circuit described in the layout design 301 at different stages of manufacturing based, at least in part, on the connectivity rules 302. For example, a condition when a top metal layer has not yet been manufactured, but other layers below the top metal layer have been manufactured, the condition can indicate the top metal layer to be an open circuit and thus blocks current flow through a portion of the resistive network corresponding to the top metal layer. In some embodiments, the layer condition system 323 can set those layers as open circuit by setting the resistance values for those layers as having resistance values of infinite or some other very high resistance value which would block the flow of current through the resistive network. In some embodiments, the layer condition system 323, in a block 403, can set resistor values of a connection between a gate of the victim transistor and the aggressor transistor to block current to flow through the connection.

The reliability verification system 320 can include a simulator 324 to simulate the conditions of the resistive network that were set by the layer condition system 323. In some embodiments, the simulator 324 can inject current into a node of an aggressor transistor and then use a numerical simulation, for example, with Kirchhoff's current law, to determine whether the injected current reaches the victim transistor. In some embodiments, the simulator 324, in a block 404, can simulate the resistive network with the set resistor values for the connection to determine connectivity between the wells of the victim transistor and the aggressor transistor. Embodiments of simulating the resistance network with blocked current flow through the connection between a gate of the victim transistor and the aggressor transistor will be described below in greater detail with reference to FIG. 6B.

FIGS. 6A-6C illustrates an example path-based layer stack connectivity check for plasma induced damage avoidance for the layout design described in FIG. 5. Referring to FIG. 6B, the resistive network 620 can be set to block the current flow through the metal 3 layer, which would include the connection between the drain region of the transistor 602 and the gate region of the transistor 604. This condition can correspond to a situation where the substrate, diffusion, metal 1, and metal 2 layers have all been manufactured, but the metal 3 layer has yet to be manufactured. A simulator can apply an injected current 621 at the source region of the transistor 602 and detect whether the source region of the transistor 604 received the current 622. The presence of received current 622 on the source region of the transistor 604 indicates the source regions of the two transistors 602 and 604 connect with each other via the resistive intervening circuitry 605, and that the connection has been made prior to manufacture of the connection between the drain region of the transistor 602 and the gate region of the transistor 604.

Referring back to FIGS. 3 and 4, in some embodiments, the layer condition system 323, in a block 405, can set resistor values of the connection between the gate of the victim transistor and the aggressor transistor to unblock current to flow through the connection. This condition set by the layer condition system 323 can correspond to when the connection between the gate of the victim transistor and the aggressor transistor has been manufactured. In some embodiments, the connectivity system 324, in a block 406, can simulate the resistive network with the set resistor values for the connection to determine electrical connectivity of the connection between the gate of the victim transistor and the aggressor transistor. Although the simulation of the layer conditions has been shown as being performed serially, in some embodiments, the layer condition system 323 can generate a matrix with the different conditions and their corresponding resistor values in each layer, and the simulator 324 can simulate the resistive network across the different conditions in parallel. The matrix and the different conditions can correspond to different connection paths through the different layers and polygons in the layout design 301, which can be associated with the connectivity rules 302. In some embodiments, the matrix can be populated with the different conditions determined by the connectivity system 324 or that were received by the reliability verification system 320 via user input. The ability to allow user-based control over whether an entire layer or specific polygons within a layer form a path between victim and aggressor transistors can add flexibility for analysis of layout designs 301 having differing construction requirement, such as in multi-chip module for three-dimensional integrated circuits (3DIC). Embodiments of simulating the resistance network with unblocked current flow through the connection between a gate of the victim transistor and the aggressor transistor will be described below in greater detail with reference to FIG. 6C.

FIGS. 6A-6C illustrates an example path-based layer stack connectivity check for plasma induced damage avoidance for the layout design described in FIG. 5. Referring to FIG. 6C, the resistive network 630 can be set to unblock the current flow through the metal 3 layer, which would include the connection between the drain region of the transistor 602 and the gate region of the transistor 604. This condition can correspond to a situation where all of the layers—substrate through metal 3—have been manufactured. A simulator can apply an injected current 631 at the drain region of the transistor 602 and detect whether the gate region of the transistor 604 received the current 632. The presence of received current 632 on the gate region of the transistor 604 indicates the connection to the gate region of the transistor 604 has been manufactured.

Referring back to FIGS. 3 and 4, the reliability verification system 320 can include a report system 325 to, in a block 407, apply one or more of the connectivity rules to the connectivity determined during the simulation(s) to ascertain whether the portion of the layout design can be manufactured to avoid plasma induced damage to a gate dielectric of a victim transistor. The report system 325 can analyze the intervening circuitry in the portion of the layout design 301 to determine whether the connection has been made through an intermediate well, often called a soft connect between aggressor and victim transistors. The report system 325 can generate a connectivity report 303 based on the results determined from the application of the connectivity rules 302 to the connectivity determined during the simulation(s). The connectivity report 303 can identify which portions of the layout design 301 conforms or do not conform with the connectivity rules 302 and/or whether any connections were made through a soft connection via an intermediate well.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

Conclusion

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to electronic design automation processes, it should be appreciated that various examples of the invention may be implemented using any desired combination of electronic design automation processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:

identifying, by a computing system, a portion of a layout design describing an integrated circuit includes a victim transistor having a gate connected to an aggressor transistor, wherein the victim transistor and the aggressor transistor have wells;

extracting, by the computing system, a resistance network for connections between the victim transistor and the aggressor transistor;

simulating, by the computing system, the resistive network to determine connectivity between the wells of the victim transistor and the aggressor transistor, and determine connectivity between the gate of the victim transistor and the aggressor transistor; and applying, by the computing system, one or more connectivity rules to the determined connectivity between the wells of the victim transistor and the aggressor transistor and the determined connectivity between the gate of the victim transistor and the aggressor transistor to ascertain that the manufacture of the portion of the layout design avoids plasma induced damage when, during manufacture of the integrated circuit, the connectivity between the wells of the victim transistor and the aggressor transistor is formed prior to the victim transistor having the gate connected to the aggressor transistor.

2. The method of claim 1, wherein simulating the resistive network further comprises:

setting resistor values of a connection between the gate of the victim transistor and the aggressor transistor to block current to flow through the connection;

injecting current at a source region of the aggressor transistor in the resistive network; and detecting a reception of the injected current at a source region of the victim transistor in the resistive network, which confirms the connectivity between the wells of the victim transistor and the aggressor transistor.

3. The method of claim 2, further comprising:

setting resistor values of the connection between the gate of the victim transistor and the aggressor transistor to unblock current to flow through the connection;

injecting, at a drain region of the aggressor transistor in the resistive network, current towards the gate of the victim transistor; and detecting a reception of the injected current at the gate of the victim transistor in the resistive network, which confirms the connection between the aggressor transistor and the gate of the victim transistor.

4. The method of claim 1, wherein extracting the resistance network for connections between the victim transistor and the aggressor transistor includes an extraction of shared intervening circuitry coupled to the wells of the victim transistor and the aggressor transistor.

5. The method of claim 4, wherein the shared intervening circuitry includes at least one of a current pump circuit coupled between source regions of the aggressor transistor and the victim transistor or a different well in the substrate coupled as a soft connection between source regions of the aggressor transistor and the victim transistor.

6. The method of claim 1, further comprising:

detecting, by the computing system through a design rule check process, the layout design includes a connectivity error corresponding to one or more design rules; and waiving, by the computing system, the connectivity error based on the determination of the connectivity between the wells of the victim transistor and the aggressor transistor occurs prior to the victim transistor having the gate connected to the aggressor transistor.

7. A system comprising:

a memory system configured to store computer-executable instructions; and a computing system, in response to execution of the computer-executable instructions, is configured to:

identify a portion of a layout design describing an integrated circuit includes a victim transistor having a gate connected to an aggressor transistor, wherein the victim transistor and the aggressor transistor have wells;

extract a resistance network for connections between the victim transistor and the aggressor transistor; and simulate the resistive network to determine connectivity between the wells of the victim transistor and the aggressor transistor, and determine connectivity between the gate of the victim transistor and the aggressor transistor; and apply one or more connectivity rules to the determined connectivity between the wells of the victim transistor and the aggressor transistor and the determined connectivity between the gate of the victim transistor and the aggressor transistor to ascertain that the manufacture of the portion of the layout design avoids plasma induced damage when, during manufacture of the integrated circuit, the connectivity between the wells of the victim transistor and the aggressor transistor is formed prior to the victim transistor having the gate connected to the aggressor transistor.

8. The system of claim 7, wherein simulating the resistive network further comprises:

setting resistor values of a connection between the gate of the victim transistor and the aggressor transistor to block current to flow through the connection;

injecting current at a source region of the aggressor transistor in the resistive network; and detecting a reception of the injected current at a source region of the victim transistor in the resistive network, which confirms the connectivity between the wells of the victim transistor and the aggressor transistor.

9. The system of claim 8, wherein simulating the resistive network further comprises:

setting resistor values of the connection between the gate of the victim transistor and the aggressor transistor to unblock current to flow through the connection;

injecting, at a drain region of the aggressor transistor in the resistive network, current towards the gate of the victim transistor; and detecting a reception of the injected current at the gate of the victim transistor in the resistive network, which confirms the connection between the aggressor transistor and the gate of the victim transistor.

10. The system of claim 7, wherein extracting the resistance network for connections between the victim transistor and the aggressor transistor includes an extraction of shared intervening circuitry coupled to the wells of the victim transistor and the aggressor transistor.

11. The system of claim 10, wherein the shared intervening circuitry includes at least one of a current pump circuit coupled between source regions of the aggressor transistor and the victim transistor or a different well in the substrate coupled as a soft connection between source regions of the aggressor transistor and the victim transistor.

12. The system of claim 7, where the computing system, in response to execution of the computer-executable instructions, is further configured to:

detect, through a design rule check process, the layout design includes a connectivity error corresponding to one or more design rules; and waive the connectivity error based on the determination of the connectivity between the wells of the victim transistor and the aggressor transistor occurs prior to the victim transistor having the gate connected to the aggressor transistor.

13. An apparatus comprising at least one computer-readable memory device storing instructions configured to cause one or more processing devices to perform operations comprising:

identifying a portion of a layout design describing an integrated circuit includes a victim transistor having a gate connected to an aggressor transistor, wherein the victim transistor and the aggressor transistor have wells;

extracting a resistance network for connections between the victim transistor and the aggressor transistor; and simulating the resistive network to determine connectivity between the wells of the victim transistor and the aggressor transistor, and determine connectivity between the gate of the victim transistor and the aggressor transistor; and applying one or more connectivity rules to the determined connectivity between the wells of the victim transistor and the aggressor transistor and the determined connectivity between the gate of the victim transistor and the aggressor transistor to ascertain that the manufacture of the portion of the layout design avoids plasma induced damage when, during manufacture of the integrated circuit, the connectivity between the wells of the victim transistor and the aggressor transistor is formed prior to the victim transistor having the gate connected to the aggressor transistor.

14. The apparatus of claim 13, wherein simulating the resistive network further comprises:

setting resistor values of a connection between the gate of the victim transistor and the aggressor transistor to block current to flow through the connection;

injecting current at a source region of the aggressor transistor in the resistive network; and detecting a reception of the injected current at a source region of the victim transistor in the resistive network, which confirms the connectivity between the wells of the victim transistor and the aggressor transistor.

15. The apparatus of claim 14, wherein simulating the resistive network further comprises:

setting resistor values of the connection between the gate of the victim transistor and the aggressor transistor to unblock current to flow through the connection;

injecting, at a drain region of the aggressor transistor in the resistive network, current towards the gate of the victim transistor; and detecting a reception of the injected current at the gate of the victim transistor in the resistive network, which confirms the connection between the aggressor transistor and the gate of the victim transistor.

16. The apparatus of claim 13, wherein extracting the resistance network for connections between the victim transistor and the aggressor transistor includes an extraction of shared intervening circuitry coupled to the wells of the victim transistor and the aggressor transistor.

17. The apparatus of claim 16, wherein the shared intervening circuitry includes at least one of a current pump circuit coupled between source regions of the aggressor transistor and the victim transistor or a different well in the substrate coupled as a soft connection between source regions of the aggressor transistor and the victim transistor.

18. The apparatus of claim 13, wherein the instructions are further configured to cause the one or more processing devices to perform operations comprising:

detecting, through a design rule check process, the layout design includes a connectivity error corresponding to one or more design rules; and waiving the connectivity error based on the determination of the connectivity between the wells of the victim transistor and the aggressor transistor occurs prior to the victim transistor having the gate connected to the aggressor transistor.

\* \* \* \* \*